(12) United States Patent
Yamamaru et al.

(10) Patent No.: US 8,870,582 B2
(45) Date of Patent: Oct. 28, 2014

(54) CHARGING PORT COVER AND CHARGING PORT STRUCTURE

(75) Inventors: Junichi Yamamaru, Ebina (JP); Daisuke Takashima, Atsugi (JP); Masaaki Takagi, Isehara (JP); Masato Inoue, Kanagawa-ken (JP); Tooru Yamashita, Hatano (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 73 days.

(21) Appl. No.: 13/820,672

(22) PCT Filed: Jul. 27, 2011

(86) PCT No.: PCT/JP2011/067089
§ 371 (c)(1),
(2), (4) Date: Mar. 4, 2013

(87) PCT Pub. No.: WO2012/043042
PCT Pub. Date: Apr. 5, 2012

(65) Prior Publication Data
US 2013/0157485 A1     Jun. 20, 2013

(30) Foreign Application Priority Data
Oct. 1, 2010     (JP) ................. 2010-223796

(51) Int. Cl.
*H01R 13/44* (2006.01)
*H02G 3/14* (2006.01)
*B60L 11/18* (2006.01)
*B60K 1/04* (2006.01)

(52) U.S. Cl.
CPC ............. *H02G 3/14* (2013.01); *B60L 11/1818* (2013.01); *B60K 1/04* (2013.01); *Y02T 90/14* (2013.01); *B60L 2270/34* (2013.01); *Y02T 90/121* (2013.01); *Y02T 10/7005* (2013.01); *Y02T 10/7088* (2013.01); *B60L 2270/32* (2013.01)
USPC ........................................................ 439/135

(58) Field of Classification Search
CPC ... H02G 3/14; B60L 11/1818; B60L 2270/34; B60L 2270/32; B60K 1/04; Y02T 90/14; Y02T 90/121; Y02T 10/7005; Y02T 10/7088
USPC .................. 439/34, 76.2, 135, 136, 500, 147; 174/67
See application file for complete search history.

(56) References Cited

U.S. PATENT DOCUMENTS

| 5,280,135 A | 1/1994 | Berlin et al. |
| 2013/0152474 A1* | 6/2013 | Yamamaru et al. ............. 49/246 |
| 2013/0153257 A1* | 6/2013 | Yamamaru et al. ............. 174/67 |

FOREIGN PATENT DOCUMENTS

| JP | 5-198336 A | 8/1993 |
| JP | 11-185861 A | 7/1999 |
| JP | 11-318004 A | 11/1999 |

*Primary Examiner* — Javaid Nasri
(74) *Attorney, Agent, or Firm* — Foley & Lardner LLP (57) ABSTRACT

A charging port cover including a cover body closing an open part formed between an opening-closing body and a vehicle body in a state where the opening-closing body is opened when a charging gun is attached to a charging inlet and charging for a vehicle-mounted battery is performed, the opening-closing body capable of opening and closing an opening portion which is provided in the vehicle body and includes the charging inlet. The cover body includes a cover-side engaging member and a cover-side engaged member which engage respectively with an engaged member and an engaging member configured to engage with the engaged member, the engaged member and the engaging member being configured to engage and lock the closed opening-closing body with the vehicle body. The cover-side engaging member and the cover-side engaged member are integrated with each other by a joining member.

3 Claims, 12 Drawing Sheets

CHARGING PORT COVER AND CHARGING PORT STRUCTURE

TECHNICAL FIELD

The present invention relates to a charging port cover which closes an open part formed between an opening-closing body in an opened state and a vehicle body when a gun for charging is attached to a charging inlet and charging is performed with the opening-closing body opened from the vehicle body, and relates to a charging port structure.

BACKGROUND ART

Conventionally, a battery mounted on an electric vehicle is charged in the following way for example. An openable and closable lid is provided for an opening portion in the vehicle body, the opening portion including a charging inlet to which a gun for charging is attached, and a gun for charging is attached to a charging inlet with the lid opened.

PRIOR ART DOCUMENT

Patent Document

Patent Document 1: Japanese Patent Application Publication No. Hei 11(1999)-318004

SUMMARY OF INVENTION

Technical Problem

Incidentally, during charging, the lid is opened from the opening portion of the vehicle body and the gun for charging which is attached to the charging inlet is exposed to the outside from the opening portion which is opened. Accordingly, when charging is performed for a long time, the gun for charging and the like may be tampered with from the outside. To counter this, the open part between the opened lid and the vehicle body may be covered with a cover. In such a case, the cover is required to be provided with a strong lock mechanism.

In view of this, an object of the present invention is to strengthen a lock mechanism set for a cover in such a structure that the cover covers an open part formed when an opening portion of a vehicle body which includes a charging inlet is opened by an opening-closing body.

Solution to Problem

According to one aspect of the present invention, an engaged member and an engaging member engaging with the engaged member are provided between an opening-closing body and a vehicle body and achieve engagement lock with the vehicle body when the opening-closing body is closed. A cover body includes a cover-side engaging member and a cover-side engaged member which engage respectively with the engaged member and the engaging member when the cover body closes the open part formed by opening of the opening-closing body during charging. The cover-side engaging member and the cover-side engaged member are integrated with each other by a joining member.

DESCRIPTION OF EMBODIMENTS

An embodiment of the present invention is described below in detail together with the drawings. In the embodiment described below, an electric car on which a rechargeable battery is mounted is given as an example. However, the present invention can be applied to a so-called hybrid car on which a battery similar to the one described above is mounted.

As shown in FIGS. 1 to 4, a bumper 1 is provided in a vehicle front end to extend in a vehicle width direction and a hood 3 covering a motor room from above is provided behind the bumper 1. The bumper 1 and the hood 3 form part of a vehicle body.

A lid 7 which is an opening-closing body capable of being opened and closed in a vertical direction (front-rear direction) is provided in a vehicle-width-direction center portion of a front end of the hood 3 via a pair of lid-side hinges 5 provided respectively on right and left sides. The lid 7 is formed in a substantially-trapezoidal shape in a plan view and is formed in such way that the length of a rear edge 9 is larger than the length of a front edge 11 and that side edges 13, 13 are inclined inward in the vehicle width direction toward the front.

Figure 1:
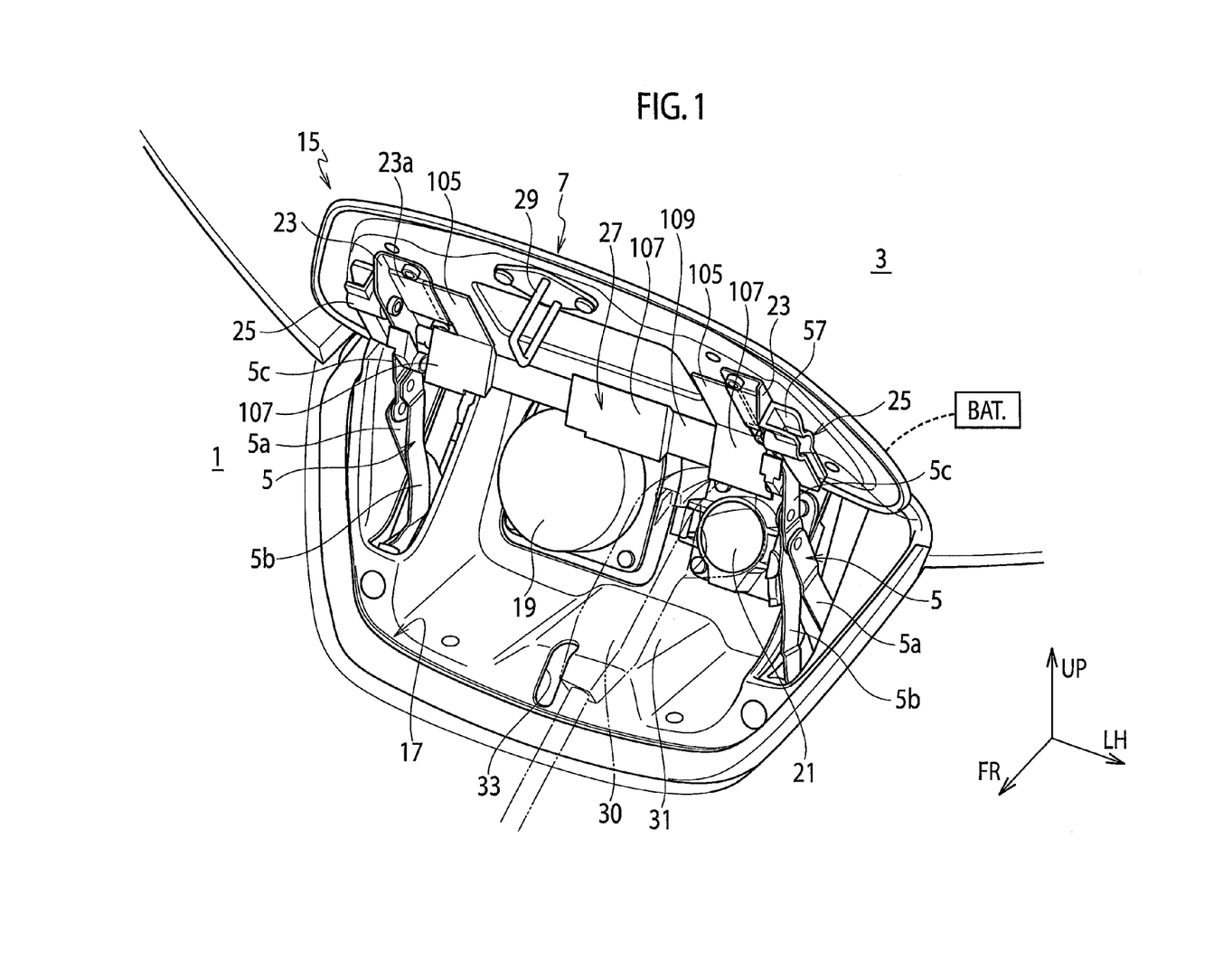
FIG. 1 is a perspective view showing a charging port in a vehicle front end portion of an embodiment of the present invention and shows a state where a lid is opened.

Each of the lid-side hinges 5 includes a first hinge arm 5a, a second hinge arm 5b, and a link bracket 5c protruding rearward and downward from a back surface of the lid 7. The first hinge arm 5a is turnably supported at one end (lower end) by the vehicle body and is turnably supported at the other end (upper end) by a vehicle-width-direction outer surface of a lower end of the link bracket 5c. Meanwhile, the second hinge arm 5b is turnably supported at one end (lower end) by the vehicle body at a position in front of the first hinge arm 5a and is turnably supported at the other end (upper end) by a vehicle-width-direction inner surface of a portion of the link bracket 5c slightly above the lower end of the link bracket 5c (a position closer to the back surface of the lid 7). The length from a turning support point of the second hinge arm 5 on the one end side to a turning support point thereof on the other end side is larger than the length from a turning support point of the first hinge arm 5a on the one end side to a turning support point thereof on the other end side. Moreover, the distance between the turning support point of the first hinge arm 5*a* on the one end side and the turning support point of the second hinge arm 5*b* on the one end side is larger than the distance between the turning support point of the first hinge arm 5*a* on the other end side and the turning support point of the second hinge arm 5*b* on the other end side.

The lid 7 is made to move parallel in the front-rear direction while turning about an axis parallel to the vehicle width direction by the lid-side hinges 5 configured as described above, when opened and closed by moving between a fully-closed position (closed position) and a fully-opened position (open position). At the fully-opened position, the lid 7 is turned about 90° from the fully-closed position and the rear edge 9 of the lid 7 is located away from a hood front end 3*a* to an upper front side thereof. Accordingly, a spacious room is provided in a charging-port opening portion 17 to be described later and, in addition, opening-closing operation of the hood 3 can be performed during charging (with a charging gun 30 to be described later inserted in a normal charging inlet 21, for example).

Moreover, as shown in FIG. 1, a charging port 15 is provided in a front end portion of a vehicle-width-direction center portion of the bumper 1. The lid 7 is a member sealing the charging-port opening portion 17 which is an opening portion formed in an upper end of the vehicle-width-direction center portion of the bumper 1. Inside the charging-port opening portion 17, a quick charging inlet 19 is arranged on a vehicle right side (on the left side when facing it) and the normal charging inlet 21 is arranged on a vehicle left side (on the right side when facing it). FIG. 1 shows a state where the charging gun 30 is inserted in the normal charging inlet 21. Charge is completed in a short time when the quick charging inlet 19 is used. Meanwhile, a relatively long time is required for the charge complete when the normal charging inlet 21 is used.

Paired right and left brackets 23, 23 having an L-shaped cross section are attached to the back surface of the lid 7 and rail members 25, 25 to be described later are attached to vehicle-width-direction outer sides of the brackets 23, 23, respectively. To be more specific, a portion 23*a* of each bracket 23 having the L-shaped cross section are bent in a recessed shape to form a gap between the portion 23*a* and the back surface of the lid 7. A gap sealing member 27 to be described later is inserted in this gap and the lid 7 thereby holds the gap sealing member 27.

Moreover, a lid-side striker 29 protruding downward (back surface side of the lid 7) is provided in the vehicle-width-direction center portion of the front end portion of the lid 7 and a striker insertion hole 33 elongating in the front-rear direction is formed at a front end in a vehicle-width-direction center portion of a bottom surface 31 of the charging-port opening portion 17. The lid-side striker 29 is formed in a U-shape in a side view. When the lid 7 is closed, the lid-side striker 29 is inserted into the striker insertion hole 33 and then engages with a vehicle-body-side lock unit 34.

The lid-side striker 29 described above forms an engaging member and the vehicle-body-side lock unit 34 forms an engaged member.

Figure 2:
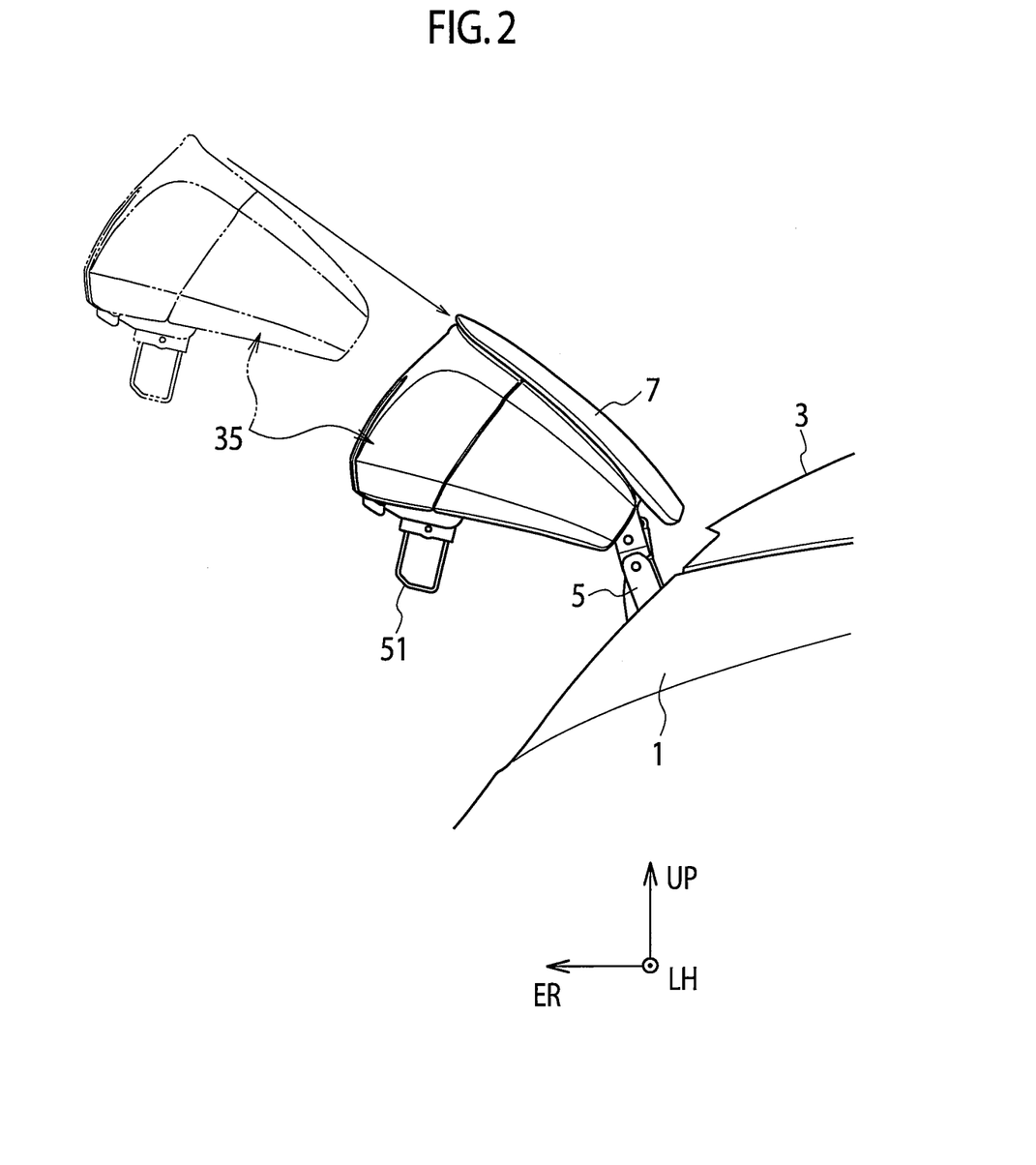
FIG. 2 is a side view showing a state where a charging port cover of the present invention is attached to the lid of FIG. 1.
Figure 3:
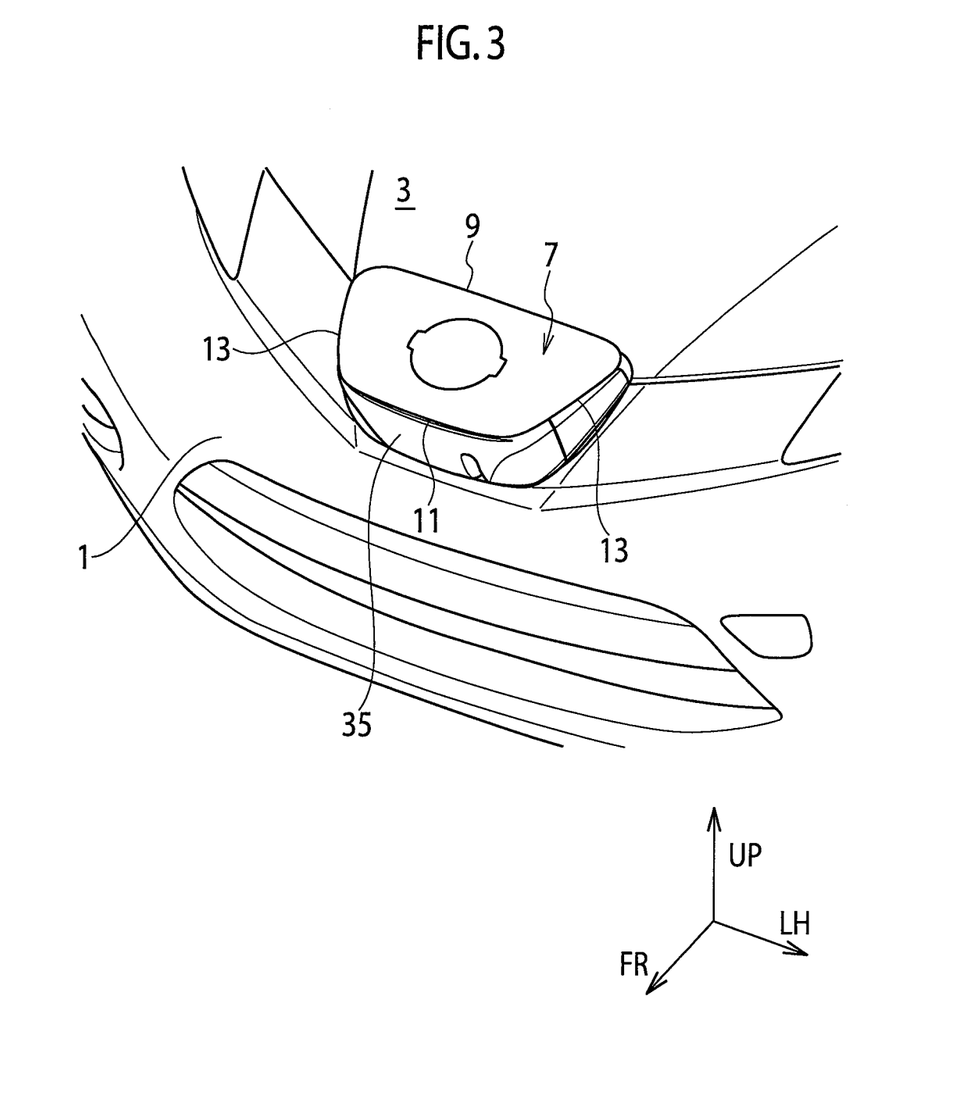
FIG. 3 is a perspective view showing a state where the charging port cover is attached to the lid and is closed.
Figure 4:
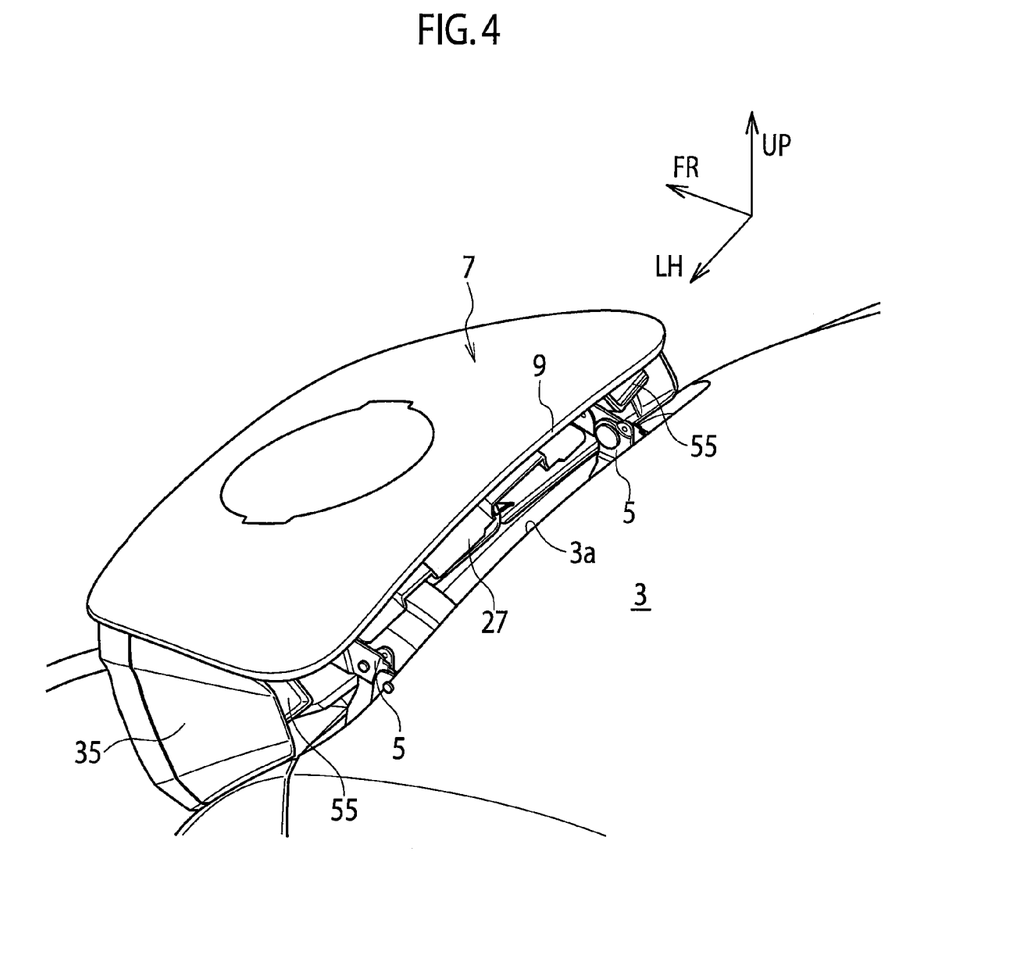
FIG. 4 is a perspective view in which the lid of FIG. 3 and its vicinity are viewed obliquely from the vehicle rear side.

Moreover, as shown in FIG. 2, a charging port cover 35 is attachable to the back surface side of the lid 7 in the opened state. FIGS. 3 and 4 show the state where the lid 7 is closed together with the charging port cover 35 in the attached state. In the state of FIGS. 3 and 4, the charging port cover 35 covers both lateral sides of the charging-port opening portion 17 in the vehicle width direction which face in axis directions (vehicle width direction) of the lid-side hinges 5 (see FIG. 1) and a front side (vehicle front side) of the lid-side hinges 5. The axis of each lid-side hinge 5 is a line parallel to a center axis of the turning movement of the lid 7 performed when the lid 7 is opened and closed by moving between the fully-closed position and the fully-opened position. In the embodiment, the axis directions of the lid-side hinges 5 are directions parallel to the vehicle width direction.

A portion covered with the charging port cover 35 described above is an open part 36 (see FIG. 11) formed between the lid 7 in the opened state (state where the lid 7 is at a position other than the fully-closed position) and the vehicle body (bumper 1 and hood 3) and the charging port cover 35 includes a cover body closing the open part 36. In the embodiment, the open part 36 can be also referred to as a space defined by the back surface of the lid 7 and the bottom surface 31 of the charging-port opening portion 17 in the state where the lid 7 is opened.

Moreover, as shown in FIG. 4, although a gap is formed in the vertical direction between the hood front end 3*a* and the rear edge 9 of the lid 7 to which the charging port cover 35 is attached, the gap sealing member 27 provided in the lid 7 prevents insertion of hands and tools into the charging-port opening portion 17 from this gap.

Note that FIG. 2 shows a state where the lid 7 to which the charging port cover 35 is attached is at the fully-opened position and the lid 7 is at a position between the fully-opened position and the fully-closed position when a cover-side striker 51 of the charging port cover 35 engages with the vehicle-body-side lock unit 34 with the charging port cover 35 attached to the lid 7 as shown in FIG. 3.

Next, the charging port cover 35 of the embodiment is described.

Figure 5:
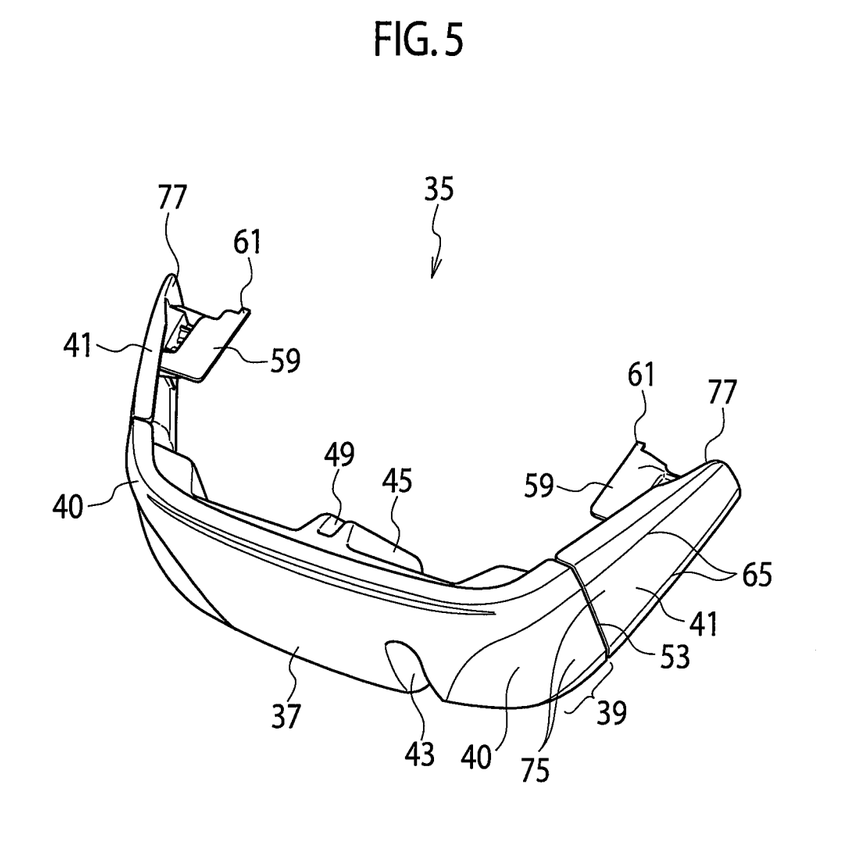
FIG. 5 is a perspective view in which the charging port cover of the embodiment of the present invention is viewed obliquely from the upper front side.
Figure 6:
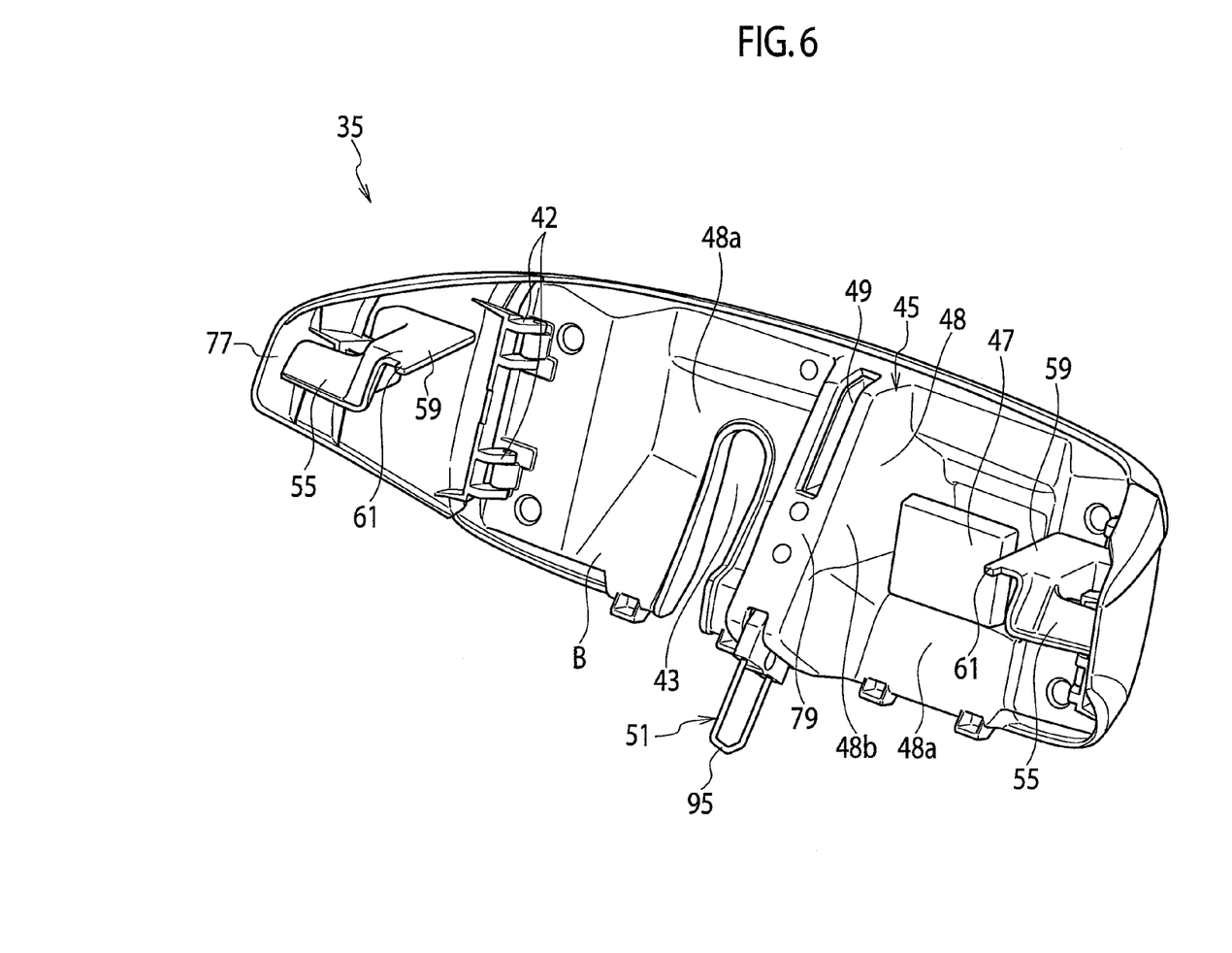
FIG. 6 is a perspective view in which the charging port cover of the embodiment of the present invention is viewed obliquely from the rear side.

As shown in FIGS. 5 and 6, the charging port cover 35 is formed in a substantial U-shape in a plan view and includes a front face section 37 disposed on a front side in the state where the charging port cover 35 is attached to the vehicle, curved sections 39, 39 curved rearward respectively from right and left ends of the front face section 37, and paired right and left side face sections 41, 41 formed separately from the curved sections 39, 39 and extending rearward respectively from rear ends of the curved sections 39. The front face section 37, the curved sections 39, 39, and the side face sections 41, 41 form the cover body.

A vertically-elongated charging cable cut out 43 extending upward from a lower end of the front face section 37 is provided in a vehicle-left-side portion of the front face section 37. A wall-shaped lock mechanism portion 45 protruding to the back surface side (rearward) is formed on the back surface of the vehicle-width-direction center portion of the front face section 37. A cable connected to the charging gun 30 (see FIG. 1) is inserted in the charging cable cut out 43 during normal charging.

A lock release lever 47 capable of releasing the engagement between the lock mechanism portion 45 and the lid-side striker 29 provided in the lid 7 is provided on the back surface of a vehicle-right-side portion of the front face section 37. In other words, the charging cable cut out 43 and the lock release lever 47 are provided on opposite sides to each other with the lock mechanism portion 45 therebetween. Moreover, a striker insertion groove 49 into which the lid-side striker 29 can be inserted is formed at an upper end of the lock mechanism portion 45 and the cover-side striker 51 which is a cover-side engaging member having a substantial U-shape in a side view protrudes downward at a lower end of the lock mechanism portion 45.

As shown in FIG. 5, a rear end of each curved section 39 of the charging port cover 35 is a split portion 53 at which the corresponding side face section 41 is folded inward relative to the curved section 39. As shown in FIG. 6, in the state where the charging port cover 35 is attached to the lid 7, the striker insertion groove 49 of the charging port cover 35 and the cover-side striker 51 are arranged in a direction (vertical direction in the embodiment) along the opening-closing trajectory of the lid 7. In other words, the cover-side striker 51 and a hook portion 89 which is an actual locking portion of a lock member 85 (see FIG. 10) to be described later are arranged side by side in the direction (vertical direction) along the opening-closing trajectory of the lid 7 and are arranged side by side in a transmission direction of a force acting at the time of locking. Moreover, each side face section 41 is configured to be turnable relative to the corresponding curved section 39 via a side face section side hinge 42. Note that "opening-closing trajectory" is a trajectory which portions of the lid 7 follow when the lid 7 is opened and closed by being moved. Moreover, "direction along the opening-closing movement trajectory" is a direction parallel to a plane orthogonal to the center axis of the turning movement of the lid 7, i.e. a direction orthogonal to a line parallel to the center axis of the turning movement, and includes the vertical direction as in the embodiment. "Arranged side by side in a transmission direction of a force acting at the time of locking" refers to an arrangement in which the cover-side striker 51 and hook portion 89 are arranged in such a way that a vector of a force acting on the cover-side striker 51 and a vector of a force acting on the hook portion 89 are at least on the same plane (preferably, on the same straight line) when an external force acts on the lid 7 to move the lid 7 in the fully-opened direction with the lid-side striker 29 and the lock member 85 engaged and locked to each other and with the cover-side striker 51 and the vehicle-body-side lock unit 34 engaged and locked to each other.

Figure 7:
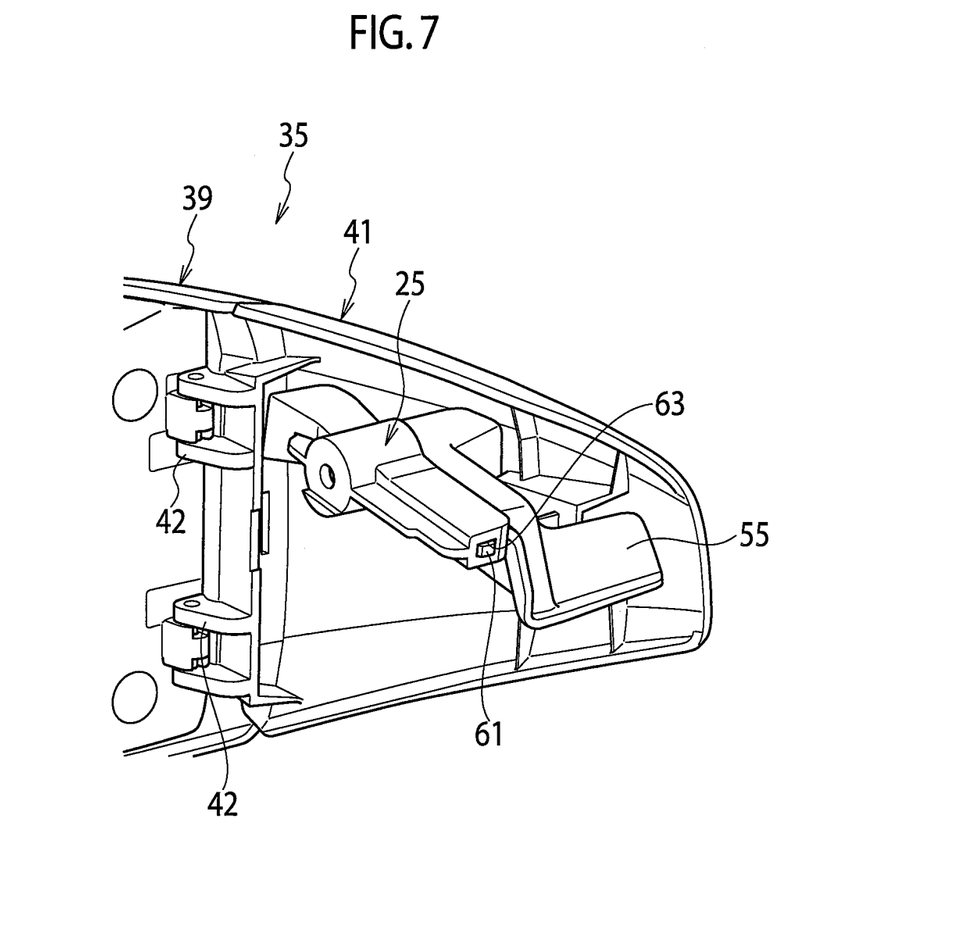
FIG. 7 is an enlarged perspective view showing an inside of a side face portion of the charging port cover.

Moreover, as shown in FIGS. 6 and 7, a shielding member 55 is formed on an inner side of each side face section 41 to protrude inward (back surface side). The shielding members 55 are provided to prevent entrance of hands and tools from gaps formed in corner portions at right and left ends of the lid rear edge 9 as also shown in FIG. 4. Moreover, an inner end portion of each shielding member 55 is an inserted engaging member 59 capable of being inserted into and engaging with a groove 57 of a corresponding one of the rail members 25 (see FIG. 1) attached to the lid 7 and a lock protrusion 61 is formed at an end of the inserted engaging member 59. The shielding member 55, the inserted engaging member 59, and the lock protrusion 61 are formed integrally with the side face section 41. As shown in FIG. 7, the lock protrusion 61 is configured to be capable of locking with a lock hole 63 formed in an end of the rail member 25.

Figure 8:
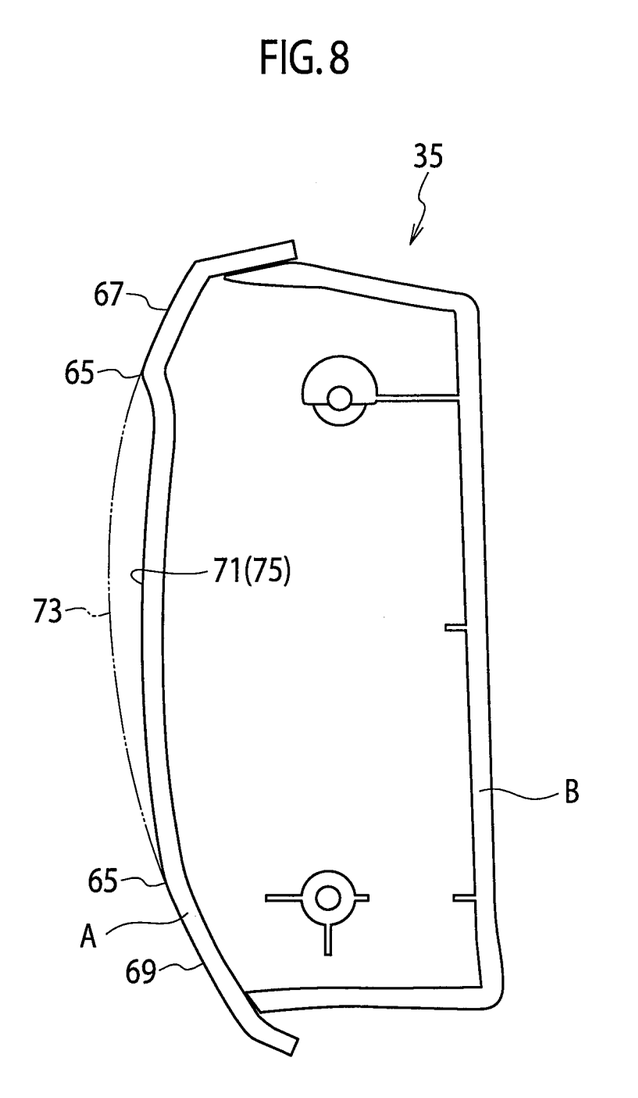
FIG. 8 is a cross-sectional view of the charging port cover in a curved section.

As shown in FIG. 5, a ridge line 65 is formed in the front-rear direction in each of upper and lower portions of the front face section 37, the curved sections 39, and the side face sections 41 in the charging port cover 35. Specifically, as shown in FIG. 8, in each curved section 39 for example, an upper end surface 67 and a lower end surface 69 are formed to have arc-shaped cross sections and an intermediate surface 71 between the upper end surface 67 and the lower end surface 69 is formed to be a recessed portion 75 recessed inward from a two-dot chain line 73 connecting the upper end surface 67 and the lower end surface 69 in an arc shape.

Figure 9:
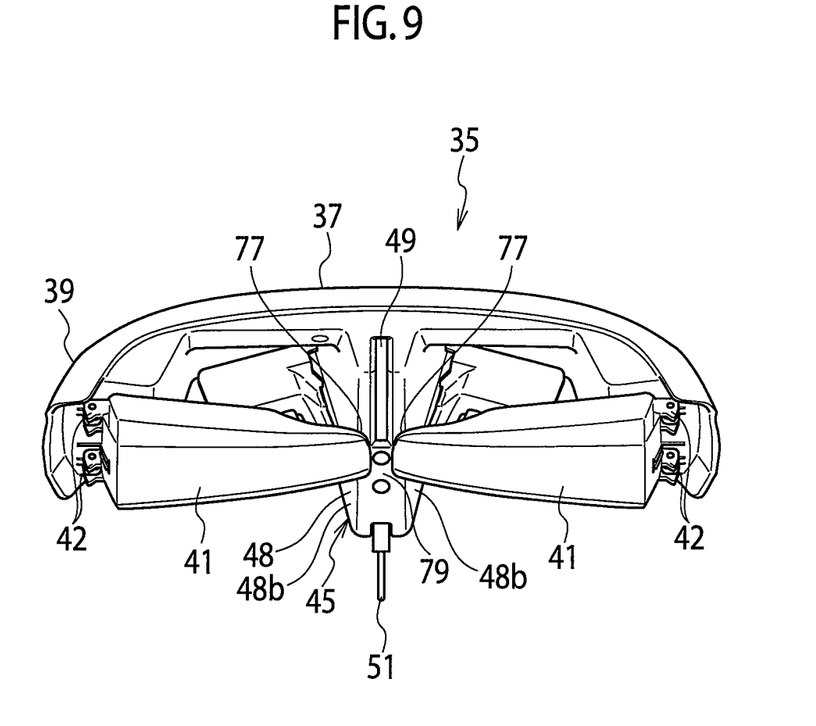
FIG. 9 is a perspective view in which the charging port cover having the side face sections folded back is viewed from the rear side.

Moreover, as shown in FIG. 6, a top surface of the lock mechanism portion 45 is a flat stopper surface 79 with which a contact portion 77 formed at an end of each side face section 41 comes into contact. Specifically, as shown in FIG. 9, when the right and left side face sections 41, 41 are completely closed to be folded back toward the back surface of the front face section 37, the contact portion 77 of each side face section 41 comes into contact with the stopper surface 79 of the lock mechanism portion 45 and the position of the side face section 41 in the closed state is maintained.

Figure 10:
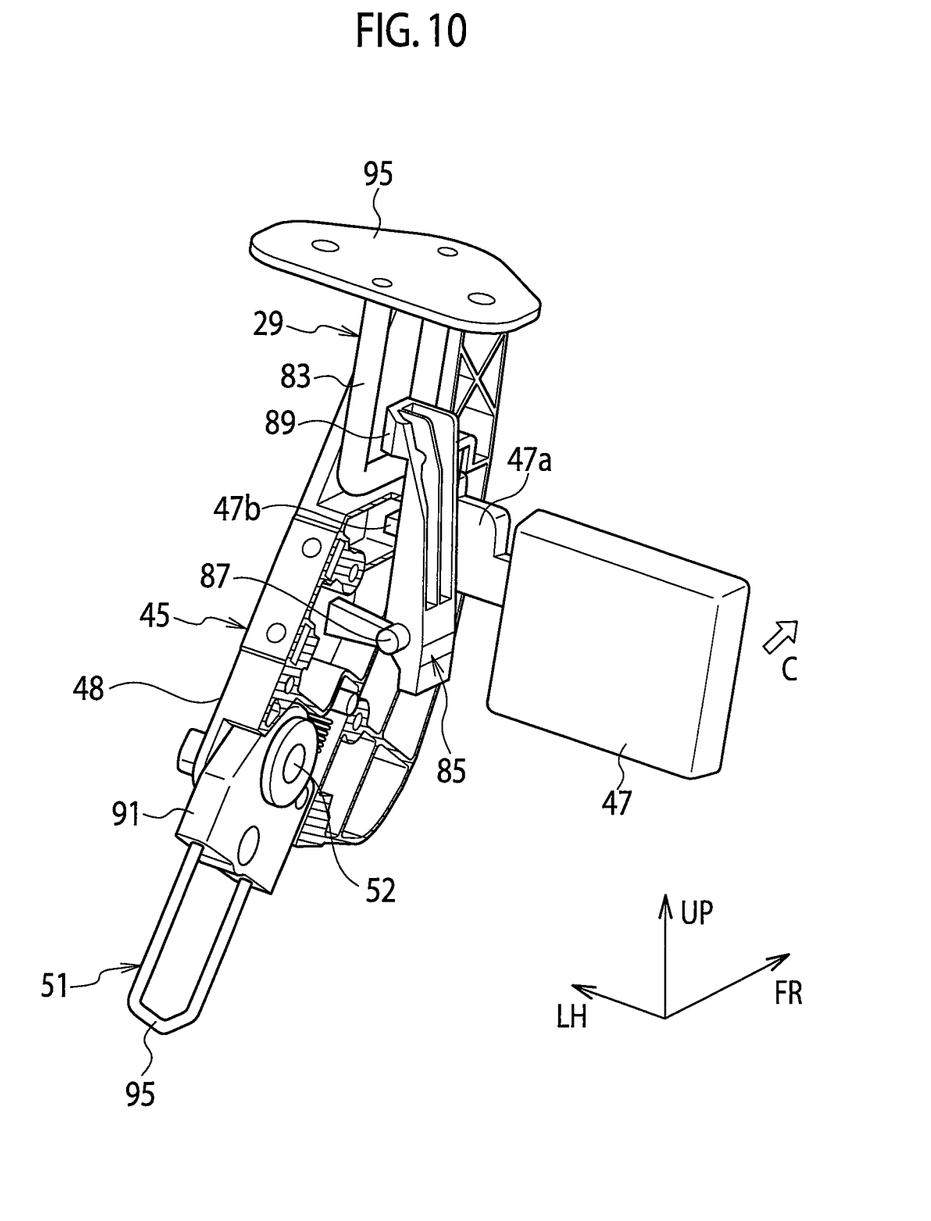
FIG. 10 is a perspective view showing an engagement mechanism of a lid and the vehicle body in the charging port cover.

As shown in FIG. 10, the lid-side striker 29 includes a support plate 81 attached to the back surface of the lid 7 and a striker body 83 having a substantial U-shape in a side view and protruding downward from the support plate 81. The lock member 85 which is a cover-side engaged member configured to turn together with the lock release lever 47 is turnably supported inside the lock mechanism portion 45 of the charging port cover 35.

Specifically, the cover-side striker 51 which is the cover-side engaging member, and the lock member 85 which is the cover-side engaged member are integrated with each other by a wall portion 48 which is a joining member in the lock mechanism portion 45. Note that the wall portion 48 is integrated with the back surface of the front face section 37.

As shown in FIG. 8, the front face section 37 and the curved sections 39 include an outer member A and an inner member B located on a back surface of the outer member A. The members A and B are made to face each other and are then joined and fixed. The wall portion 48 is formed integrally with the inner member B, is provided in a vehicle-width-direction center portion of the inner member B to protrude rearward, and extends in the vertical direction in a substantially straight shape. Moreover, the wall portion 48 has a hollow structure having a substantial U-shape whose horizontal cross-sectional shape is opened frontward, and, as shown in FIG. 6, includes: the stopper surface 79 which is a rear end face; and paired right and left inclined surfaces 48b which extend to incline in such a way that the distance therebetween becomes larger from right and left edges of the stopper surface 79 toward the back surface of the front face section 37, i.e. general surfaces 48a of the inner member B on both sides of the wall portion 48.

A lower end portion of the lock member 85 is turnably supported about an axis substantially perpendicular to the front face section 37 via a pin 87 and an upper end portion of the lock member 85 is formed to be the hook portion 89 whose distal end is curved. The lock member 85 is pressed in such a direction that the hook portion 89 is locked to the striker body 83 as shown in FIG. 10, by a torsion coil spring which is provided on the pin 87 and which is not illustrated.

An arm member 47a protruding toward the lock mechanism portion 45 is provided integrally with the lock release lever 47 on the side close to the lock mechanism portion 45. A turn supporting shaft which is not illustrated and which has a shaft center extending in the vertical direction is provided in a distal end portion of the arm member 47a and is turnably supported by the wall portion 48 of the lock mechanism portion 45. Furthermore, a lock-member pressing portion 47b curved substantially at a right angle to the arm member 47a in a direction away from the front face section 37 is provided integrally with the arm member 47a. A distal end of the lock-member pressing portion 47b can be brought into contact with the side surface of the lock member 85 on the right side in the vehicle width direction (on the left side in FIG. 10). In other words, the lock release lever 47 integrally including the arm member 47a and the lock-member pressing portion 47b is turnable about the turn supporting shaft not illustrated.

Moreover, since the lock member 85 is housed in the wall portion 48 having a hollow interior, the arm member 47a penetrates one of the inclined surfaces 48b which are side surfaces of the wall portion 48 and the distal end side of the arm member 47a including the lock-member pressing portion 47b is located inside the wall portion 48.

In the normal state, the hook portion 89 of the lock member 85 is locked to the striker body 83 of the lid-side striker 29. When the lock release lever 47 is pressed in a direction of the arrow C (direction toward the front face section 37), the lock-member pressing portion 47b presses the lock member 85 against a force of the torsion coil spring not illustrated to turn the lock member 85 about the pin 87 and the hook portion 89 is thereby released from the striker body 83.

Figure 11:
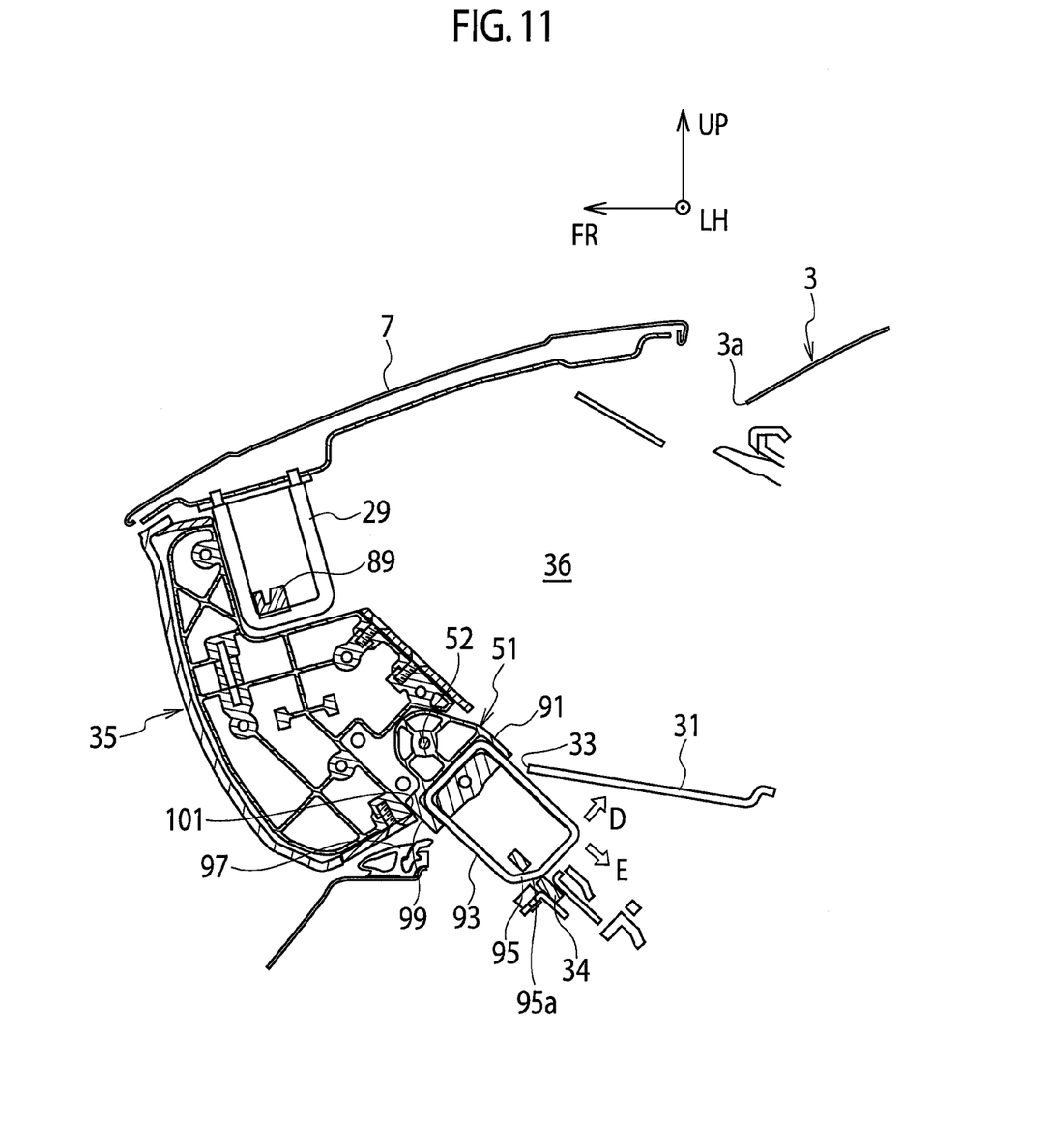
FIG. 11 is a cross-sectional view showing the state where the lid to which the charging port cover is attached is closed.

As shown in FIGS. 10 and 11, the cover-side striker 51 includes a holding bracket 91 made of plastic and a striker body 93 attached to the holding bracket 91 and having a square ring shape in a side view. The striker body 93 turns relative to the wall portion 48 about a turning center 52 of the holding bracket 91, together with the holding bracket 91.

A lower corner 95 of the striker body 93 on a side close to the front face section 37 is an inclined portion 95a curved toward an inner peripheral side. The inclined portion 95a is configured to come into contact with an opening edge 97 on a vehicle body side when the charging port cover 35 attached to the lid 7 is closed.

A front edge 99 of the holding bracket 91 can come into contact with a contact portion 101 of the lock mechanism portion 45. Due to this contact, the holding bracket 91 is prevented from turning frontward (a clockwise direction in FIG. 11) but is allowed to turn rearward. Accordingly, the cover-side striker 51 turns only rearward as shown by the arrow D.

Specifically, the inclined portion 95a of the striker body 93 comes into contact with the opening edge 97 on the vehicle body side when the charging port cover 35 attached to the lid 7 is closed, and the cover-side striker 51 can thereby turn in the direction of the arrow D while avoiding the opening edge 97 on the vehicle body side which is an obstacle.

Figure 12:
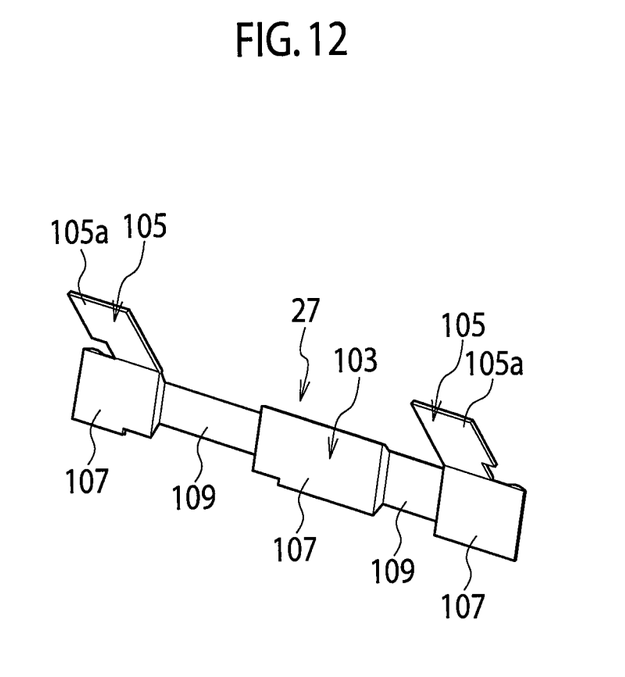
FIG. 12 is a perspective view showing a gap sealing member of the embodiment of the present invention.

As shown in FIG. 12, the gap sealing member 27 is formed of a plate-shaped plastic piece which is elastic and formed integrally of: a main body portion 103 formed to be elongated in a lateral direction; and paired right and left locking portions 105, 105 extending upward respectively from right and left ends of the main body portion 103. The main body portion 103 includes: general surfaces 107 disposed respectively in an intermediate portion and both end portions; and recessed faces 109 formed between the adjacent general surfaces 107. The recessed faces 109 are recessed inward (toward the vehicle rear side) from the general surfaces 107 in the state attached to the lid 7. The recessed face 109 on the left side when facing it is a portion to be a recess for a charge gun for quick charging when the charge gun is inserted into the quick charging inlet 19. The recessed face 109 on the right side when facing it is a portion to be a recess for the charging gun 30 for normal charging when the charging gun 30 is inserted into the normal charging inlet 21. End portions 105a of the locking portions 105 are fitted into gaps between the brackets 23 shown in FIG. 1 and the back surface of the lid 7 and the gap sealing member 27 is thereby held as descried above.

Next, description is given of a charge operation of the battery mounted on the vehicle which is performed by using the normal charging inlet 21 and which requires a long time. First, a lock release lever in the vehicle is operated in the state where the lid 7 is closed and the lock between the lid-side striker 29 and the vehicle-body-side lock unit 34 is released. The lid 7 is thereby set to the opened state at the fully-opened position as shown in FIG. 1. Then, charging is performed by attaching the charging gun 30 to the normal charging inlet 21 in this state.

The charging port cover 35 in which the side face sections 41, 41 are opened relative to the front face section 37 as shown in FIG. 5 is attached to the lid 7 as shown in FIG. 2 with the charging gun 30 attached to the normal charging inlet 21. At this time, the inserted engaging members 59 of the charging port cover 35 shown in FIG. 6 are inserted into and engaged with the grooves 57 of the rail members 25 shown in FIG. 1. During this insertion, the engagement lock state between the lid-side striker 29 and the lock member 85 is released by turning the lock release lever 47 shown in FIGS. 6 and 10 in such a way as to be pressed against the back surface of the front face section 37.

After the inserted engaging members 59 of the charging port cover 35 are inserted into the grooves 57 of the rail member 25, the pressing operation of the lock release lever 47 is stopped and the lock-member pressing portion 47b on the distal end side of the lock release lever 47 thereby stops pressing the lock member 85. As a result, the lock member 85 is turned by the torsion coil spring not illustrated and the hook portion 89 is locked to the striker body 83 as shown in FIG. 10.

The work of pressing the lock release lever 47 against the back surface of the front face section 37 is performed by, for example, grabbing portions on both sides of the lock mechanism portion 45 in the front face section 37 of the charging port cover 35 with both hands from below. At this time, the thumb of each hand is placed on a front surface side of the front face section 37 while the other four fingers of each hand are placed on the back surfaces side of the front face section 37. Then, the lock release lever 47 is pressed by at least one of the four fingers on the back surface side. Such release work of the lock release lever 47 can be performed easily and is no different from work of simply grabbing the charging port cover 35 with the thumb on the front surface side and the four fingers on the back surface side.

After the charging port cover 35 is attached and locked to the lid 7, the lid 7 is closed together with the charging port cover 35 as shown in FIGS. 3 and 4. When the charging port cover 35 is closed, the inclined portion 95a of the striker body 93 in the cover-side striker 51 comes into contact with the opening edge 97 on the vehicle body side. By this contact, the cover-side striker 51 enters the striker insertion hole 33 while turning about the turning center 52 in the direction of the arrow D in FIG. 11 in such a way as to avoid the opening edge 97. Then, the cover-side striker 51 engages with the vehicle-body-side lock unit 34 and is thereby locked.

As shown in FIG. 11, the charging port cover 35 thus closes the open part 36 formed between the lid 7 and the vehicle body such as the bumper 1 with the lid 7 being at, for example, a half-opened position between the fully-opened position and the fully-closed position. This suppresses entrance of hands and tools into the charging-port opening portion 17 in tampering, particularly at night when charging is performed for a long time.

At this time, as shown in FIG. 4, the shielding member 55 provided in the charging port cover 35 suppresses entrance of hands and tools into the charging-port opening portion 17 from the gaps formed in the corner portions at the right and left ends of the lid rear edge 9. Moreover, the gap sealing member 27 provided in the lid 7 suppresses insertion of hands and tools into the charging-port opening portion 17 from the gap between the rear edge 9 of the lid 7 and the hood front end 3a.

After the charging is completed, the lock release lever in the vehicle is operated and the lock between the cover-side striker 51 of the charging port cover 35 and the vehicle-body-side lock unit 34 in the state shown in FIG. 11 is thereby released. In this state, the lid 7 is opened together with the charging port cover 35.

Thereafter, the work of attaching the charging port cover 35 to the lid 7 in FIG. 2 is performed in reverse and the charging port cover 35 is removed from the lid 7. After the charging port cover 35 is removed, the charging gun 30 shown in FIG. 1 is pulled out from the normal charging inlet 21, the normal charging inlet 21 is closed with a cap not illustrated, and then the lid 7 is closed.

The removed charging port cover 35 is set from the state shown in FIG. 5 to the state shown in FIG. 9 and the side face sections 41, 41 are folded back toward the back surface of the front face section 37 to overlap therewith. At this time, the contact portion 77 at the end of each of the side face sections 41, 41 comes into contact with the stopper surface 79 of the lock mechanism portion 45 and the position of the side face section 41 in the closed state is maintained.

In the charging port cover 35 of the embodiment, the cover-side striker 51 being the cover-side engaging member and the lock member 85 being the cover-side engaged member which engage with the lid 7 in the opened state and the vehicle body are integrated with each other by the wall portion 48 which is the joining member of the lock mechanism portion 45.

This strengthens the lock mechanism of the charging port cover 35 compared to the configuration in which the cover-side striker 51 and the lock member 85 are separately attached to the front face section 37. Moreover, the distance between the cover-side striker 51 and the lock member 85 can be accurately secured by integrating the cover-side striker 51 and the lock member 85 with each other by the wall portion 48. As a result, the lid-side striker 29 and the vehicle-body-side lock unit 34 can be locked to each other more surely with the charging port cover 35 closing the open part 36.

Moreover, in the embodiment, the cover-side striker 51 can turn about the turning center 52 relative to the front face section 37 in the direction (direction shown by the arrow D) which is along the opening-closing movement trajectory in opening and closing of the charging port cover 35 together with the lid 7 and which is different from an engagement lock direction of the cover-side striker 51 and the vehicle-body-side lock unit 34, in a state where the lid-side striker 29 and the lock member 85 of the charging port cover 35 are engaged with each other and the charging port cover 35 is thereby attached to the lid 7. The lock engagement direction is a direction in which the cover-side striker 51 moves when the cover-side striker 51 engages with the vehicle-body-side lock unit 34 and is, for example, the direction of the arrow E substantially perpendicular to the arrow D of FIG. 11 on a sheet surface. The opening-closing movement trajectory is a trajectory which portions of the lid 7 and the charging port cover 35 follow when the lid 7 is moved together with the charging port cover 35 to be opened and closed with the charging port cover 35 attached to the lid 7. The direction along the opening-closing movement trajectory is a direction parallel to a plane orthogonal to a line parallel to the center axis of the turning movement of the lid 7, i.e. a direction orthogonal to a line parallel to the center axis of the turning movement. Accordingly, the cover-side striker 51 being turnable in the direction which is along the opening-closing movement trajectory and which is different from the engagement lock direction means that the axis of the turning center 52 of the cover side striker 51 and the center axis of the turning movement of the lid 7 are substantially parallel to each other.

Accordingly, when the charging port cover 35 attached to the lid 7 is closed and the inclined portion 95a of the striker body 93 comes into contact with the opening edge 97 on the vehicle body side, the cover-side striker 51 can turn in the direction of the arrow D in FIG. 11 and be locked while avoiding the opening edge 97 on the vehicle body side which is an obstacle.

The embodiment of the present invention has been described above. However, the embodiment is merely an example described to facilitate the understanding of the present invention and the present invention is not limited to the embodiment. The technical scope of the present invention is not limited to the specific technical matters disclosed in the embodiment and includes various modifications, changes, and alternative techniques which can be easily derived therefrom. For example, in the embodiment, the charging port 15 is provided in the vehicle-width-direction center portion of the bumper 1. However, the position and orientation of the charging port is not limited to this and may be set as appropriate depending on the specifications. For example, the charging port may be provided on a side surface of the vehicle body, facing in a lateral direction, or on a rear face of the vehicle body, facing upward. Moreover, in the embodiment, the lid 7 is configured to move parallel in the front-rear direction while turning about the axis parallel to the vehicle width direction, when being moved to be closed and opened. However, the mode of opening and closing movement of the lid is not limited to this. For example, the turning movement may be performed in the front-rear direction of the vehicle or about an axis parallel to the vertical direction. Furthermore, the turning axis may be inclined. In the embodiment, the cover-side striker 51 is configured to be turnable relative to the front face section 37 about the turning center 52. However, the cover-side striker may be configured to be movable parallel in the front-rear direction relative to the front face section of the cover by providing a rail and a groove in the holding bracket of the cover-side striker and the wall portion holding the holding bracket.

This application claims priority based on Japanese Patent Application No. 2010-223796 filed on Oct. 1, 2010, the entire content of which is incorporated herein by reference.

INDUSTRIAL APPLICABILITY

In the invention, since the cover-side engaged member and the cover-side engaging member which engage with the closing-opening body in the opened state and the vehicle body are integrated with each other by the joining member, the lock mechanism of the charging port cover can be strengthened.

REFERENCE SIGNS LIST 1 bumper (vehicle body)
3 hood (vehicle body)
7 lid (opening-closing body)
17 charging-port opening portion (opening portion)
21 normal charging inlet
29 lid-side striker (engaging member)
30 charging gun
34 vehicle-body-side lock unit (engaged member)
36 open part formed between lid and vehicle body
37 front face section of charge port cover (cover body)
39 curved section of charge port cover (cover body)
41 side face section of charge port cover (cover body)
45 lock mechanism portion (joining member)
51 cover-side striker (cover-side engaging member)
85 lock member (cover-side engaged member)

The invention claimed is:

1. A charging port cover comprising a cover body closing an open part formed between an opening-closing body and a vehicle body in a state where the opening-closing body is opened when a gun for charging is attached to a charging inlet and charging for a battery mounted on a vehicle is performed, the opening-closing body capable of opening and closing an opening portion which is provided in the vehicle body of the vehicle and which includes the charging inlet, wherein the cover body includes a cover-side engaging member and a cover-side engaged member which engage respectively with an engaged member and an engaging member configured to engage with the engaged member, when the open part is closed, the engaged member and the engaging member provided between the opening-closing body and the vehicle body and configured to engage and lock the closed opening-closing body with the vehicle body, and the cover-side engaging member and the cover-side engaged member are integrated with each other by a joining member.

2. The charging port cover according to claim 1, wherein the cover body includes the cover-side engaged member with which the engaging member provided in the opening-closing body engages and the cover-side engaging member which engages with the engaged member provided in the vehicle body, and the cover-side engaging member is capable of moving relative to the cover body in a direction which is along an opening-closing movement trajectory of the cover body being opened and closed together with the opening-closing body and which is different from an engagement lock direction of the cover-side engaging member and the engaged member of the vehicle body, in a state where the engaging member of the opening-closing body and the cover-side engaged member are engaged with each other and the cover body is thereby attached to the opening-closing body.

3. A charging port structure comprising:

a charging inlet which is disposed in an opening portion provided in a vehicle body and to which a gun for charging a battery mounted on a vehicle is attached;

an opening-closing body which is provided in the vehicle body and which is capable of being opened and closed by being moved between an opened position where the opening portion is opened and a closed position where the opening portion is closed;

an engaged member and an engaging member configured to engage with the engaged member, the engaged member and the engaging member provided between the opening-closing body and the vehicle body and configured to engage and lock the opening-closing body at the closed position with the vehicle body;

a cover body which is disposed between the vehicle body and the opening-closing body at a position other than the closed position and which closes an open part formed between the opening-closing body and the vehicle body;

a cover-side engaging member and a cover-side engaged member which are provided in the cover body and which engage respectively with the engaged member and the engaging member when the cover body closes the open part; and a joining member which is provided in the cover body and which integrates the cover-side engaging member and the cover-side engaged member with each other.

\* \* \* \* \*